April 24, 1945.    A. A. COE    2,374,526
BRAKE
Filed Dec. 23, 1942

INVENTOR.
ALBERT A. COE
BY
Jn. W. McConkey

UNITED STATES PATENT OFFICE 2,374,526

BRAKE

Albert A. Coe, Seattle, Wash., assignor to Bendix Aviation Corporation, South Bend, Ind., a corporation of Delaware Application December 23, 1942, Serial No. 469,857

7 Claims. (Cl. 188—78)

This invention relates to brakes and particularly to those portions of a brake applying system where the actual friction stopping force is created.

It is an object of this invention to provide improved actuating or shoe spreading means for a brake of the type in which a plurality of rigid arcuate brake shoes are individually shiftable to anchor at either end according to the direction of rotation of a circular brake drum with which they come into contact. To this end I contemplate utilizing in a two shoe brake, a thrust link for exerting an outward force at one end of one shoe, a lever pivoted on the other shoe for thrusting the link and transmitting the thrust reaction through its pivot to move the adjacent end of the second shoe outwardly, a second lever pivoted at the opposite end of the second shoe and adapted to exert an actuating force against the first lever and to simultaneously exert through its pivot an outward force at the adjacent end of the second shoe, and an applying means for exerting a spreading force between the second lever and the remaining end of the first shoe.

The second object of my invention is the provision of service brake applying means and auxiliary or emergency brake applying means which both exert force against a lever pivoted on a shoe and a thrust link pivoted to the lever and to the other shoe to spread the shoes at one end thereof.

Figure 1:
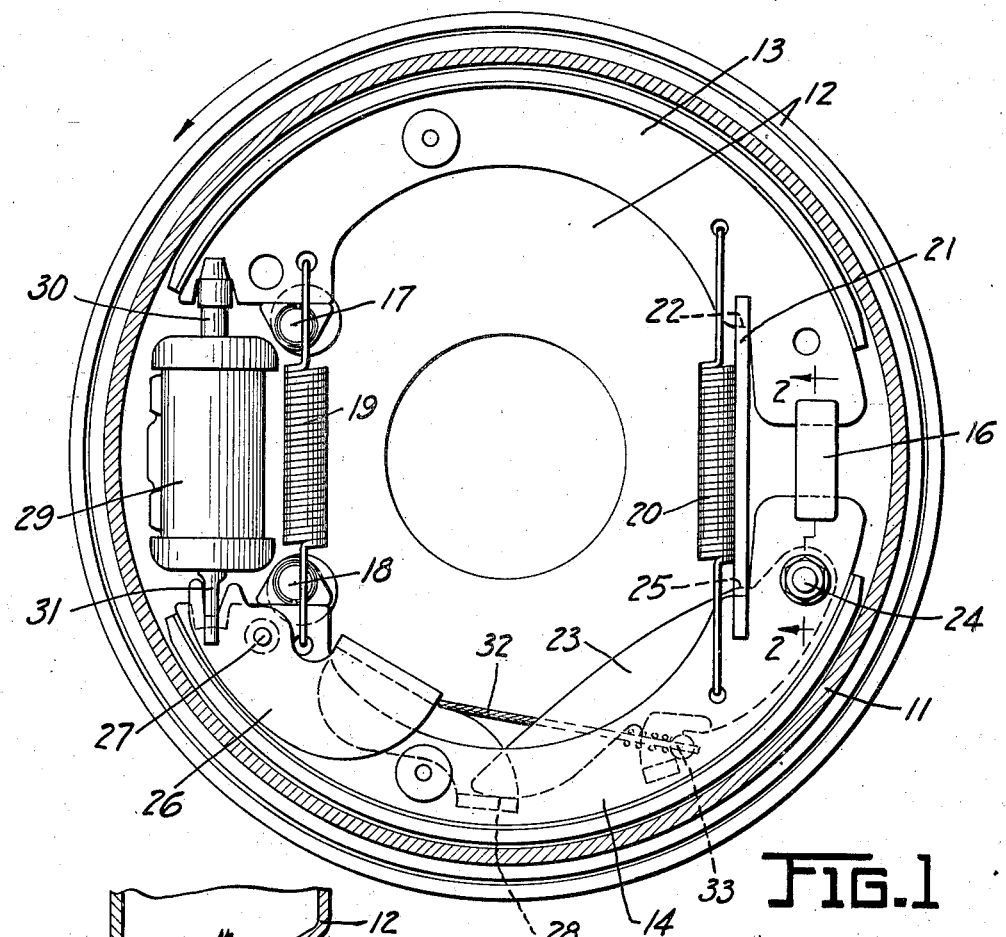
Figure 2:
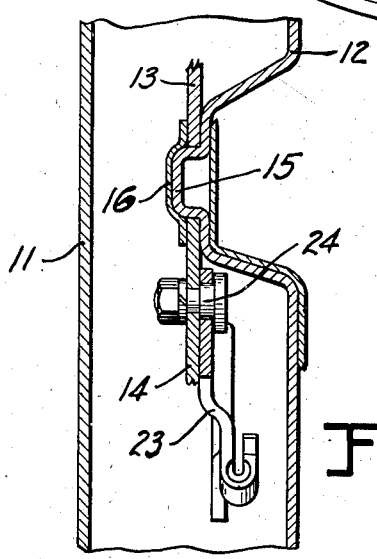

Other objects and advantages of my invention will become apparent during the course of the following description, reference being had therein to the accompanying drawing:

Figure 1 is a vertical section taken through a brake friction creating assembly on a line which is just inside the head of the brake drum and showing the brake shoes in side elevation; and Figure 2 is a section taken on the line 2—2 of Figure 1.

The brake shown comprises a rotatable brake drum 11, a combined backing plate and support 12 at the open side of the drum, and T-section shoes 13 and 14 which are individually shiftable to anchor at either end according to the direction of drum rotation. At one end the shoes may anchor upon a raised portion 15 of the backing plate to which is attached a clamp 16 for preventing lateral displacement of the shoe webs. At the other side of the brake, adjustable anchors 17 and 18 are provided for the shoe, these anchors serving both to take the applying torque of the shoes and to adjust the released position of the shoes as demanded by wear. The shoes are normally maintained in released position by return springs 19 and 20 which urge both ends of both shoes toward their anchored positions. It will be noted that the shoes extend substantially horizontally, that is, a line drawn from end to end of each shoe would more nearly approach the horizontal than the vertical.

The mechanism for accomplishing a normal service application of the shoes comprises a thrust link 21 pivoted at 22 on shoe 13, a lever 23 pivoted at 24 on shoe 14 and at 25 on thrust link 21, a second lever 26 pivoted at 27 on shoe 14 and at 28 on lever 23, and a hydraulic applying cylinder 29 mounted on the backing plate and having its pistons (not shown) connected by a thrust rod 30 to shoe 13 by a thrust rod 31 to lever 26.

Emergency applying mechanism for the brake includes a substantially horizontally extending cable 32 connected by a ball and socket connection 33 to lever 23.

Operation of my improved brake is as follows. Hydraulic fluid forced under pressure between the pistons of hydraulic cylinder 29 will simultaneously exert an outward force to move the left end of shoe 13 against the drum and to turn lever 26 in a counterclockwise direction about its pivot 27. Force tending to rotate lever 26 will simultaneously tend to move lever 23 in a clockwise direction about its pivot 24 and through pivot 27 tend to move the left end of shoe 14 against the brake drum. Clockwise movement of lever 23 will exert a force through pivot 24 tending to move the right end of shoe 14 against the brake drum and a thrust force through link 21 tending to move the right end of shoe 13 against the drum. Thus application of the service or hydraulic brake will exert a force at or near each end of each shoe tending to move the shoes against the drum. Application of the auxiliary or emergency brake is accomplished by actuating mechanical linkage to create a tension in cable 32 which will draw lever 23 in a clockwise direction and thus, acting through pivot 24 and link 21, spread the shoes at the right end thereof, both shoes pivoting at the left side of the brake. The emergency brake applying linkage thus utilizes a lever and link which form a part of the normal service applying system.

Although a specific embodiment of my invention has been described for illustrative purposes, it is not my intention to limit the scope of the invention to such embodiment or otherwise than by the terms of the following claims.

I claim:

1. Shoe spreading means for a brake having a plurality of shoes comprising a lever pivoted on one shoe, thrust means pivoted on the lever and pivoted to the other shoe, a second lever for moving the first lever in a direction to exert a shoe spreading force through the thrust means and the pivotal connection of the first lever with the first shoe, means for actuating the second lever, and means independent of said actuating means for moving the first lever in a shoe spreading direction.

2. Shoe spreading means for a brake having a plurality of shoes comprising a lever pivoted on one shoe, thrust means pivoted on the lever and pivoted to the other shoe, a second lever for moving the first lever in a direction to exert a shoe spreading force through the thrust means and the pivotal connection of the first lever with the first shoe, means for actuating the second lever, and means independent of said actuating means for moving the first lever in a shoe spreading direction, the last named means constituting operator operated mechanical linkage.

3. A brake comprising two substantially horizontally extending shoes, a lever pivoted on one shoe, thrust means pivoted on the lever and pivoted to the other shoe, a second lever for moving the first lever in a direction to exert a shoe spreading force through the thrust means and the pivotal connection of the first lever with the first shoe, means for actuating the second lever, and means independent of said actuating means for moving the first lever in a shoe spreading direction, the last named means including a substantially horizontally extending cable connected to the first lever.

4. A brake comprising a rotatable brake drum, two shoes each moveable to anchor at either end according to the direction of drum rotation, anchoring means contacted by the anchoring ends of the shoes regardless of the direction of drum rotation, a thrust link pivotally connected to one end of one of the shoes, a lever pivoted at one end of the second shoe and pivotally connected to the thrust link, a second lever pivoted at the other end of said second shoe and pivotally connected to the first lever, and applying means between the ends of the shoe opposite the thrust link having direct applying connection with the adjacent end of the first shoe and having pivotal applying connection with the second lever.

5. A brake comprising a rotatable brake drum, two shoes each moveable to anchor at either end according to the direction of drum rotation, anchoring means contacted by the anchoring ends of the shoes regardless of the direction of drum rotation, a thrust link pivotally connected to one end of one of the shoes, a lever pivoted at one end of the second shoe and pivotally connected to the thrust link, a second lever pivoted at the other end of said second shoe and pivotally connected to the first lever, and applying means between the ends of the shoe opposite the thrust link having direct applying connection with the adjacent end of the first shoe and having pivotal applying connection with the second lever to rotate said lever about its pivot on the second shoe exerting a force on the first lever and simultaneously transmitting the reaction through said pivot to the end of the second shoe adjacent the applying means.

6. A brake comprising a rotatable brake drum, two shoes each moveable to anchor at either end according to the direction of drum rotation, anchoring means contacted by the anchoring ends of the shoes regardless of the direction of drum rotation, a thrust link pivotally connected to one end of one of the shoes, a lever pivoted at one end of the second shoe and pivotally connected to the thrust link, a second lever pivoted at the other end of said second shoe and contacting the first lever, the pivotal connection of the thrust link to the first lever being located between the pivot of said lever on said second shoe and the contact point of said first lever with the second lever, and applying means between the ends of the shoe opposite the thrust link having direct applying connection with the adjacent end of the first shoe and having pivotal applying connection with the second lever to rotate said lever about its pivot on the second shoe exerting a force on the first lever and transmitting the reaction through said pivot to the end of the second shoe adjacent the applying means, while simultaneously the force exerted by the second lever on the first lever turns the first lever about its pivot to thrust through the link against one end of the first shoe and to transmit the reaction through the pivot to the end of the second shoe adjacent the thrust link.

7. A brake as claimed in claim 4 in which the applying means is constituted by a hydraulic cylinder.

ALBERT A. COE.